(12) United States Patent
Machida

(10) Patent No.: US 7,191,324 B2
(45) Date of Patent: Mar. 13, 2007

(54) AUTOMATIC COMPUTER CONFIGURATION SYSTEM, METHOD AND PROGRAM MAKING USE OF PORTABLE TERMINAL

(75) Inventor: Satoshi Machida, Tokyo (JP)

(73) Assignee: NEC Corporation, Tokyo (JP)

( * ) Notice: Subject to any disclaimer, the term of this patent is extended or adjusted under 35 U.S.C. 154(b) by 434 days.

(21) Appl. No.: 10/231,178

(22) Filed: Aug. 30, 2002

(65) Prior Publication Data

US 2003/0055928 A1    Mar. 20, 2003

(30) Foreign Application Priority Data

Sep. 3, 2001    (JP)    ............... 2001-265710

(51) Int. Cl.
*G06F 9/24*    (2006.01)
(52) U.S. Cl. ............................. 713/1; 714/36
(58) Field of Classification Search ............... None
See application file for complete search history.

(56) References Cited

U.S. PATENT DOCUMENTS

| 5,832,202 | A | * | 11/1998 | Slavenburg et al. | 714/16 |
| 5,961,641 | A | * | 10/1999 | Hasegawa et al. | 713/1 |
| 6,108,712 | A | * | 8/2000 | Hayes, Jr. | 709/246 |
| 6,859,821 | B1 | * | 2/2005 | Ozzie et al. | 709/205 |
| 6,871,193 | B1 | * | 3/2005 | Campbell et al. | 705/67 |

FOREIGN PATENT DOCUMENTS

| JP | 07-175547 | 7/1995 |
| JP | 07-262118 | 10/1995 |
| JP | 07-306831 | 11/1995 |
| JP | 08-272721 | 10/1996 |
| JP | 11-024898 | 1/1999 |
| JP | 11-296635 | 10/1999 |
| JP | 2000-148637 | 5/2000 |
| JP | 2000-222318 | 8/2000 |
| JP | 2000-229102 | 8/2000 |
| JP | 2001-230699 | 8/2001 |

OTHER PUBLICATIONS

Japanese Office Action dated Jul. 26, 2005 with a partial English translation.

* cited by examiner

*Primary Examiner*—Rehana Perveen
*Assistant Examiner*—Anand B. Patel
(74) *Attorney, Agent, or Firm*—McGinn IP Law Group, PLLC

(57) ABSTRACT

An automatic computer configuration system is disclosed wherein a portable terminal such as a portable telephone set which has been spread widely and is usually carried by a user can be used to automatically configure a computer suitably for a particular user. The automatic computer configuration system comprises a portable terminal and a computer connected to the portable terminal. The portable terminal stores unique computer configuration information to be used for configuration of a computer specified for a particular user. Upon login by a user, the computer communicates with the portable terminal to receive the computer configuration information stored in the portable terminal and automatically configures the computer itself based on the received computer configuration information. Upon logout, the computer transmits the latest computer configuration to the portable terminal and restores the configuration using computer configuration information used before the computer configuration information is rewritten with the unique computer configuration information received from the portable terminal, or restores a default configuration using default computer configuration information.

3 Claims, 5 Drawing Sheets

AUTOMATIC COMPUTER CONFIGURATION SYSTEM, METHOD AND PROGRAM MAKING USE OF PORTABLE TERMINAL

BACKGROUND OF THE INVENTION

1. Field of the Invention

The present invention relates to a system, method and program for making it possible to make use of a portable terminal such as a portable telephone set, which has been spread widely and is usually carried by a user, to automatically configure a computer suitably for a particular user.

2. Description of the Related Art

Taking it into consideration that a PC card slot is provided in many information terminals such as personal computers, it has been proposed to use a PC card as a configuration device for an information terminal, for example, in Japanese Patent Laid-Open No. 296635/1999. The PC card includes a memory in which configuration information for an information terminal is stored, and a control section for controlling reading out from and writing into the memory and executing, when the PC card is inserted into a PC card slot of an information terminal, configuration of the information terminal based on the configuration information stored in the memory.

As computers have been spread widely in companies, homes and so forth, it is often the case that a person uses several computers totally in a company and at home in its daily life. Usually, configuration of a computer need be performed for each computer. For example, in order for each individual to set the desk top screen of a computer in a company and customize the desk top screen of a computer at home, the individual must configure the computers separately. Further, where the same computer is used commonly by a plurality of users, each user must perform configuration for the user itself upon logon.

While the technique disclosed in Japanese Patent Laid-Open No. 296635/1999 is directed to use of a PC card for execution of such configuration, it has the following problems.

The first problem resides in inconvenience in that the PC card can be used only with a computer or a like apparatus which has a PC card slot and therefore cannot be used in a similar manner for configuration of all computers which may be used by the user.

The second problem resides in that, when the user goes out and wants to use a computer or the like at the destination, the PC card which is not carried usually must be carried.

Incidentally, portable telephone sets and portable information terminals (hereinafter referred to collectively as portable terminals) have been and are being spread quickly, and under the existing conditions, a person possesses at least one portable terminal.

SUMMARY OF THE INVENTION

It is an object of the present invention to provide an automatic computer configuration system, method and program wherein a portable terminal such as a portable telephone set which has been spread widely and is usually carried by a user can be used to automatically configure a computer suitably for a particular user.

In order to attain the object described above, according to an aspect of the present invention, there is provided an automatic computer configuration system, comprising a portable terminal, and a computer connected to the portable terminal, the portable terminal including storage means in which unique computer configuration information to be used for configuration of a computer specified for a particular user is stored, the computer including means for communicating with the portable terminal upon login by a user to receive the computer configuration information stored in the portable terminal and automatically configuring the computer itself based on the received computer configuration information.

According to another aspect of the present invention, there is provided an automatic computer configuration system, comprising a portable terminal, a computer connected to the portable terminal, and an information management server connected to the computer over a network, the information management server including storage means in which unique computer configuration information to be used for configuration of a computer specified for a particular user is stored, the computer including means for communicating with the portable terminal upon login by a user to access the information management server over the network based on ID information allocated to the portable terminal to receive the computer configuration information stored in the information management server and automatically configuring the computer itself based on the received computer configuration information.

According to a further aspect of the present invention, there is provided an automatic computer configuration system, comprising a portable terminal, a computer connected to the portable terminal, and an information management server connected to the computer and the portable terminal over a network, the information management server including storage means in which unique computer configuration information to be used for configuration of a computer specified for a particular user is stored, the computer including means for communicating with the portable terminal upon login by a user to access the information management server over the network, the portable terminal including means for accessing, in response to the communication with the computer, the information management server over the network to acquire the computer configuration information stored in the information management server and transmitting the acquired computer configuration information to the computer, the computer further including means for receiving the computer configuration information transmitted from the portable terminal and automatically configuring the computer itself based on the received computer configuration information.

According to a still further aspect of the present invention, there is provided an automatic computer configuration method, comprising the steps of causing, upon login of a computer by a user, the computer to communicate with a particular portable terminal to receive unique computer configuration information to be used for configuration of a computer specified for a particular user stored in the portable terminal, and rewriting computer configuration information currently established in the computer based on the received computer configuration information to change the configuration of the computer to that specified for the user.

The automatic computer configuration method further comprises the step of transmitting the latest computer configuration information from the computer to the portable terminal so that the latest computer configuration information may be stored into the portable terminal. This makes it possible to retain the computer configuration information updated by the computer side in the portable terminal.

The automatic computer configuration method may further comprise the step of restoring, after the latest computer configuration information is transmitted to the portable terminal, the configuration of the computer using the computer configuration information used before the computer configuration information is rewritten with the unique computer configuration information received from the portable terminal or the step of restoring a default configuration using default computer configuration information after the latest computer configuration is transmitted to the portable terminal.

According to a yet further aspect of the present invention, there is provided an automatic computer configuration method, comprising the steps of transmitting, upon login of a computer by a user, ID information stored in a particular portable terminal from the portable terminal to the computer, accessing, from the computer receiving the ID information, an information management server over a network based on the ID information so that unique computer configuration information stored in the information management server for being used for configuration of a computer specified for a particular user is downloaded to the computer, and rewriting computer configuration information currently established in the computer based on the downloaded computer configuration information to change the configuration of the computer to that specified for the user.

The automatic computer configuration method may further comprise the step of transmitting the latest computer configuration information from the computer to the information management server over the network so that the latest computer configuration information may be stored into the information management server. This makes it possible to retain the computer configuration information updated by the computer side in the information management server.

The automatic computer configuration method may further comprise the step of restoring, after the latest computer configuration information is transmitted to the information management server, the configuration of the computer using the computer configuration information used before the computer configuration information is rewritten with the unique computer configuration information received from the information management server or the step of restoring a default configuration using default computer configuration information after the latest computer configuration is transmitted to the information management server.

According to a yet further aspect of the present invention, there is provided an automatic computer configuration method, comprising the steps of accessing, upon login of a computer by a user, an information management server from a particular portable terminal over a network so that unique computer configuration information stored in the information management server for being used for configuration of a computer specified for a particular user is downloaded to the computer, and rewriting computer configuration information currently established in the computer based on the downloaded computer configuration information to change the configuration of the computer to that specified for the user.

The automatic computer configuration method may further comprise the step of transmitting the latest computer configuration information from the computer to the information management server through the portable terminal so that the latest computer configuration information may be stored into the information management server. This makes it possible to retain the computer configuration information updated by the computer side in the portable terminal.

The automatic computer configuration method may further comprise the step of restoring, after the latest computer configuration information is transmitted to the information management server through the portable terminal, the configuration of the computer using the computer configuration information used before the computer configuration information is rewritten with the unique computer configuration information received from the information management server or the step of restoring a default configuration using default computer configuration information after the latest computer configuration is transmitted to the information management server through the portable terminal.

According to an additional aspect of the present invention, there is provided a program for automatically configuring a computer, comprising the steps of accessing, upon login of a computer by a user, a particular portable terminal connected to the computer to receive unique computer configuration information to be used for configuration specified for a particular user stored in the portable terminal from the portable terminal, and rewriting computer configuration information currently established in the computer based on the received computer configuration information to change the configuration of the computer to that specified for the user.

The program may further comprise the step of transmitting the latest computer configuration information to the portable terminal so that the latest computer configuration information may be stored into the portable terminal. The program may further comprise the step of restoring the configuration of the computer using the computer configuration information used before the computer configuration information is rewritten with the unique computer configuration information received from the portable terminal or the step of restoring a default configuration of the computer using default computer configuration information.

According to another additional aspect of the present invention, there is provided a program for automatically configuring a computer, comprising the steps of acquiring, upon login of a computer by a user, ID information stored in a particular portable terminal connected to the computer from the portable terminal, accessing an information management server over a network based on the ID information so that unique computer configuration information stored in the information management server for being used for configuration specified for a particular user is downloaded to the computer, and rewriting computer configuration information currently established in the computer based on the downloaded computer configuration information to change the configuration of the computer to that specified for the user.

The program may further comprise the step of transmitting the latest computer configuration information to the information management server over the network so that the latest computer configuration information may be stored into the information management server. The program may further comprise the step of restoring the configuration of the computer using the computer configuration information used before the computer configuration information is rewritten with the unique computer configuration information received from the information management server or the step of restoring a default configuration using default computer configuration information.

According to a further additional aspect of the present invention, there is provided a program for automatically configuring a computer, comprising the steps of accessing, upon login of a computer by a user, an information management server through a particular portable terminal connected to the computer over a network so that unique computer configuration information stored in the information management server for being used for configuration specified for a particular user is downloaded to the computer, and rewriting computer configuration information currently established in the computer based on the downloaded computer configuration information to change the configuration of the computer to that specified for the user.

The program may further comprise the step of transmitting the latest computer configuration information to the information management server through the portable terminal over the network so that the latest computer configuration information maybe stored into the information management server. The program may further comprise the step of restoring the configuration of the computer using the computer configuration information used before the computer configuration information is rewritten with the unique computer configuration information received from the information management server or the step of restoring a default configuration using default computer configuration information.

With the automatic computer configuration systems and methods and the programs according to the present invention, a portable terminal which has been spread widely and is usually carried by a user can be utilized at any place of a destination of the user to automatically configure a computer located at the place specifically for the user in regard to various configuration particulars and use the computer with the common configuration particulars. Consequently, the user can use any computer at any place with the common configuration. Further, when the user itself updates the configuration for a computer, even if the configuration of some computer is changed by a third party, advantageously the computer can be automatically configured in accordance with the configuration specified for the user using the portable terminal. The configuration particulars in use of a computer mentioned above may be, for example, configurations of the desk top screen, mailing software, a web browser and various kinds of software.

Further, where the unique computer configuration information is stored in an information management server, the information can be managed in a centralized manner. Besides, since the computer configuration information need not be stored in the portable terminal, the memory of the portable terminal is not occupied by the computer configuration information and therefore can be utilized effectively.

The above and other objects, features and advantages of the present invention will become apparent from the following description and the appended claims, taken in conjunction with the accompanying drawings in which like parts or elements are denoted by like reference symbols.

DESCRIPTION OF THE PREFERRED EMBODIMENTS

Figure 1:
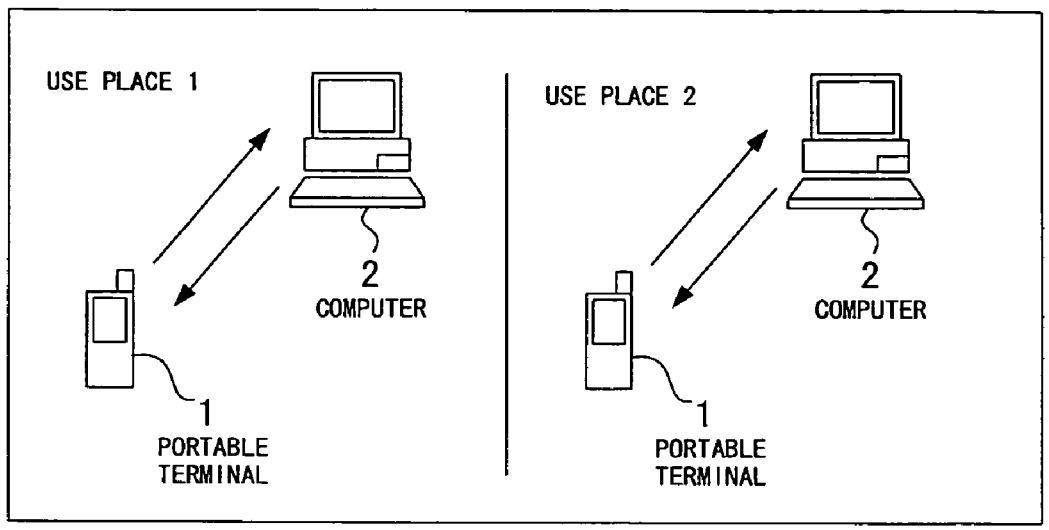
FIG. 1 is a schematic view showing a system configuration of an automatic computer configuration system to which the present invention is applied.
Figure 4:
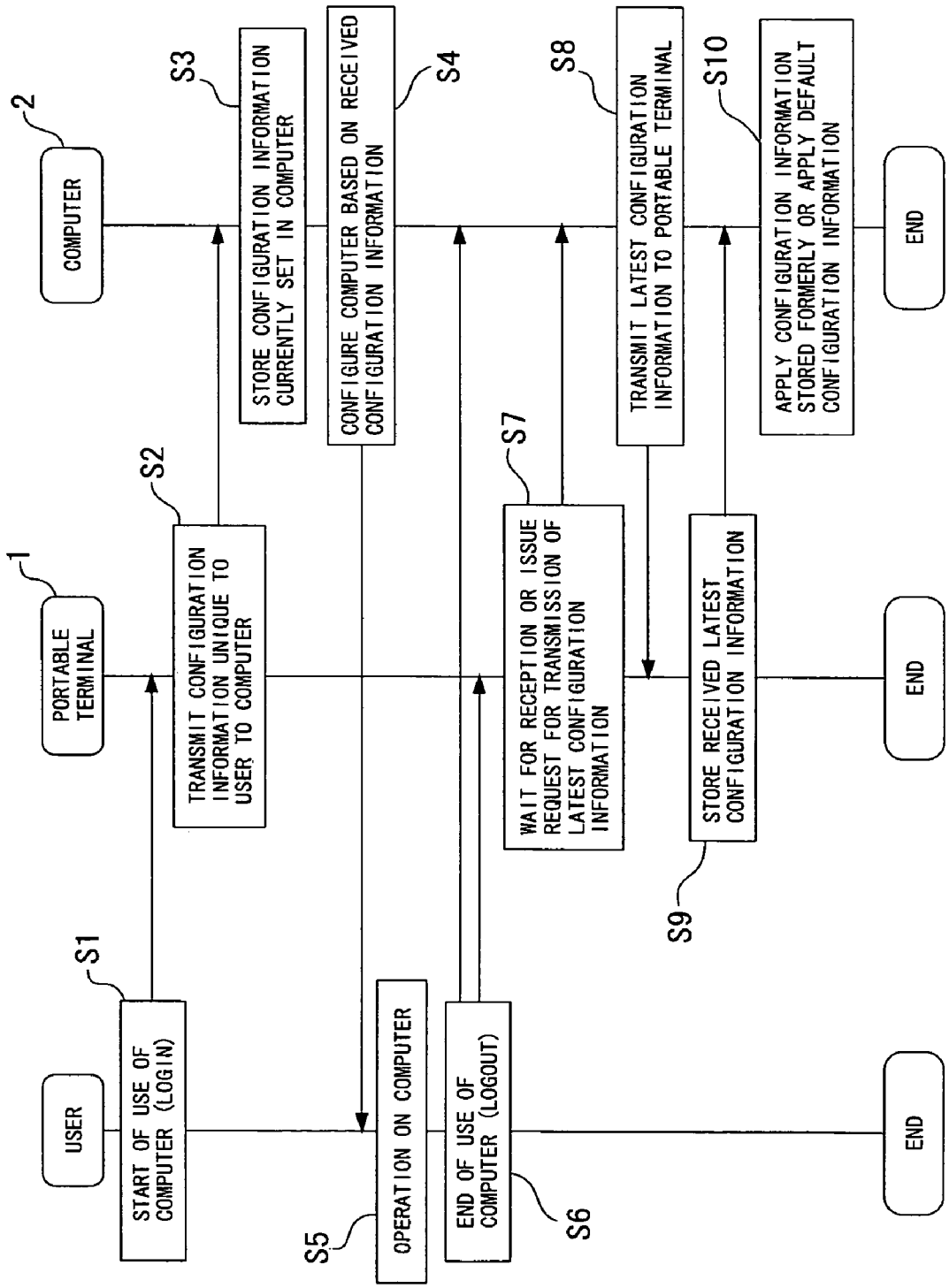
FIG. 4 is a flow diagram illustrating operation of the automatic computer configuration system of FIG. 1.

Referring first to FIG. 1, there is shown a system construction of an automatic computer configuration system to which the present invention is applied. In the automatic computer configuration system shown, unique computer configuration information to be used for configuration of computers 2 specified for a particular user of the computers 2 is stored in a portable terminal 1 such as a portable telephone set. Then, when the user logs in any of the computers 2, the portable terminal 1 carried by the user communicates with the computer 2 by wire communication or wireless communication at the place where the computer 2 is used to configure the computer 2 specified for the user using the computer configuration information stored in the portable terminal 1. A flow of operations of the system in this instance is described below with reference to FIG. 4.

If the user first connects, for example, at a use place 1, the portable terminal 1 of the user itself to a computer 2 located at the use place 1 by wire or wireless connection and logs in the computer 2 (step S1), then the unique computer configuration information to be used for configuration specified for the user itself stored in the portable terminal 1 is transmitted from the portable terminal 1 to the computer 2 (step S2).

The computer 2 stores (backs up) configuration information currently set in the computer 2 (step S3) and automatically configures the computer 2 itself with the computer configuration information received from the portable terminal 1 (step S4) to exchangeably establish the configuration specified for the user. Consequently, the user can proceed immediately with operation of the computer 2 in accordance with the configuration suitable for the user itself without changing the configuration through manual inputting operation every time the user logs in the computer 2 (step S5).

When the use of the computer 2 comes to an end (upon logout) (step S6), the portable terminal 1 enters a reception waiting mode or issues a transmission request (step S7) in order to receive the latest computer configuration information from the computer 2. When the computer 2 transmits the latest configuration information to the portable terminal 1 (step S8), the portable terminal 1 receives and stores the latest configuration information (step S9). Thereafter, the computer 2 uses the original computer configuration information stored for the backup formerly to restore the configuration (step S10). Or otherwise, the computer 2 uses default configuration information set in advance to restore the original default configuration. The former case may be selected where the computer 2 is located at some other place in the company, and the latter case may be selected where the computer 2 is located at a public place such as a railway station or a city office so that it may be used by non-specified people. Naturally, the computer 2 may not restore the configuration but keep the condition as it is when the use of the computer 2 comes to an end.

If a similar procedure is applied to another computer 2 at another use place 2, then the user can use the computer 2 with the configuration same as that with which the user usually uses a computer.

It is to be noted that the latest configuration information from the computer 2 may be transmitted to the portable terminal 1 every time the configuration is updated.

In the system of the first embodiment described above, computer configuration information itself unique to a user is communicated between the portable terminal 1 and a computer 2. Therefore, the amount of communicated information between the portable terminal 1 and a computer 2 is greater than that in a system of a second embodiment described below.

Figure 2:
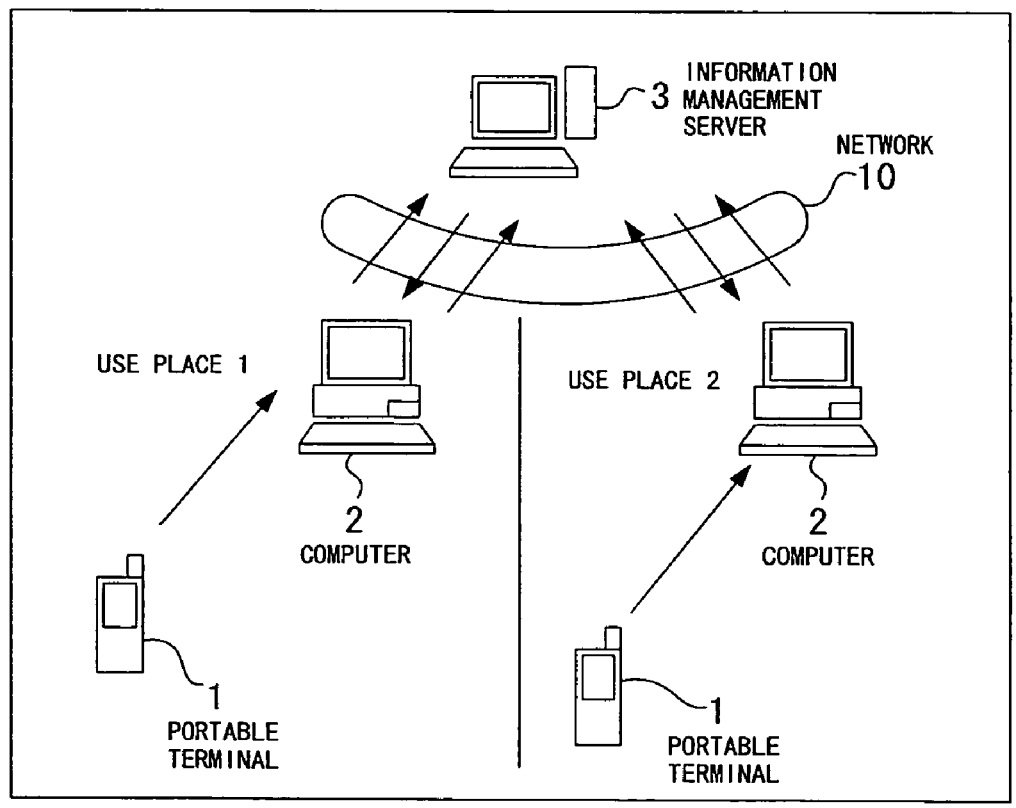
FIG. 2 is a schematic view showing a system construction of another automatic computer configuration system to which the present invention is applied.
Figure 5:
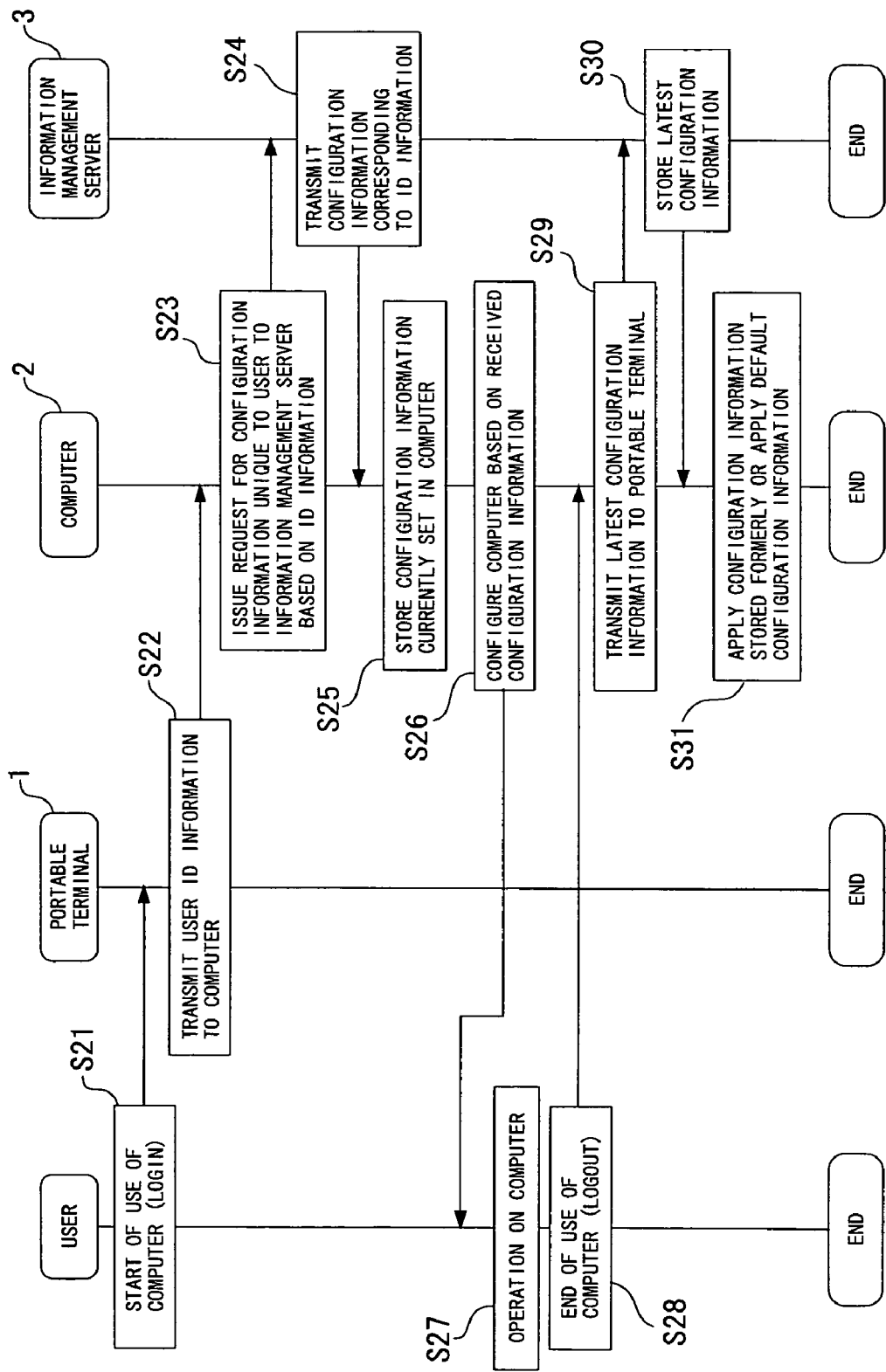
FIG. 5 is a similar view but illustrating operation of the automatic computer configuration system of FIG. 2.

FIG. 2 shows a system construction of an automatic computer configuration system according to the second embodiment of the present invention. Referring to FIG. 2, in the system shown, unique computer configuration information to be used for configuration of a computer 2 specified for a particular user is stored in an information management server 3 on a network 10 such as the Internet or an intranet. When the user logs in a computer 2, a portable terminal 1 possessed by the user and the computer 2 communicate with each other to transmit ID information unique to the user allocated to the portable terminal 1 from the portable terminal 1 to the computer 2. The computer 2 thus acquiring the ID information accesses the information management server 3 based on the ID information to acquire computer configuration information from the information management server 3 and automatically establishes the configuration specified for the user. A flow of operations of the system in this instance is described below with reference to FIG. 5.

If the user first connects, for example, at a use place 1, the portable terminal 1 of the user itself to a computer 2 located at the use place 1 by wire or wireless connection and logs in the computer 2 (step S21), then the unique computer configuration information of the user stored in the portable terminal 1 is transmitted from the portable terminal 1 to the computer 2 (step S22).

The computer 2 accesses the information management server 3 based on the acquired ID information (step S23). The information management server 3 thus transmits computer configuration information corresponding to the ID information to the computer 2 (step S24). In other words, the computer configuration information is downloaded from the information management server 3 to the computer 2.

The computer 2 stores configuration information currently set therein (step S25) and automatically configures the computer 2 itself with the computer configuration information downloaded from the information management server 3 (step S26) to exchangeably establish the configuration specified for the user. Consequently, the user can proceed immediately with operation of the computer 2 in accordance with the configuration suitable for the user itself without changing the configuration through manual inputting operation every time the user logs in the computer 2 (step S27).

When the use of the computer 2 comes to an end (upon logout) (step S28), the computer 2 transmits the latest computer configuration information to the information management server 3 (step S29), and the information management server 3 receives and stores the latest computer configuration information (step S30). Thereafter, the computer 2 uses the original computer configuration information stored for the backup formerly to restore the configuration (step S31). Or otherwise, the computer 2 uses default configuration information set in advance to restore the original default configuration.

In the system of the second embodiment described above, only ID information of a user is communicated between the portable terminal 1 and the computer 2. Therefore, the amount of communicated information between the portable terminal 1 and the computer 2 is smaller than that in the system of the first embodiment described hereinabove. However, it is necessary to prepare the information management server 3.

Figure 3:
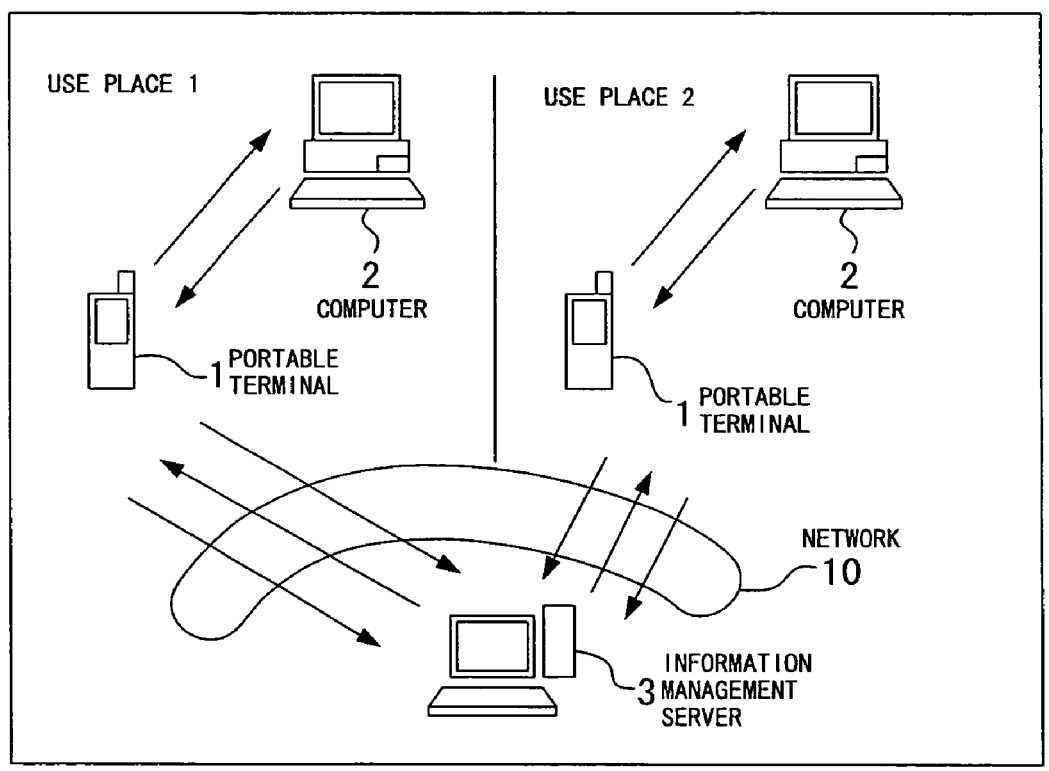
FIG. 3 is a schematic view showing a system construction of a further automatic computer configuration system to which the present invention is applied.
Figure 6:
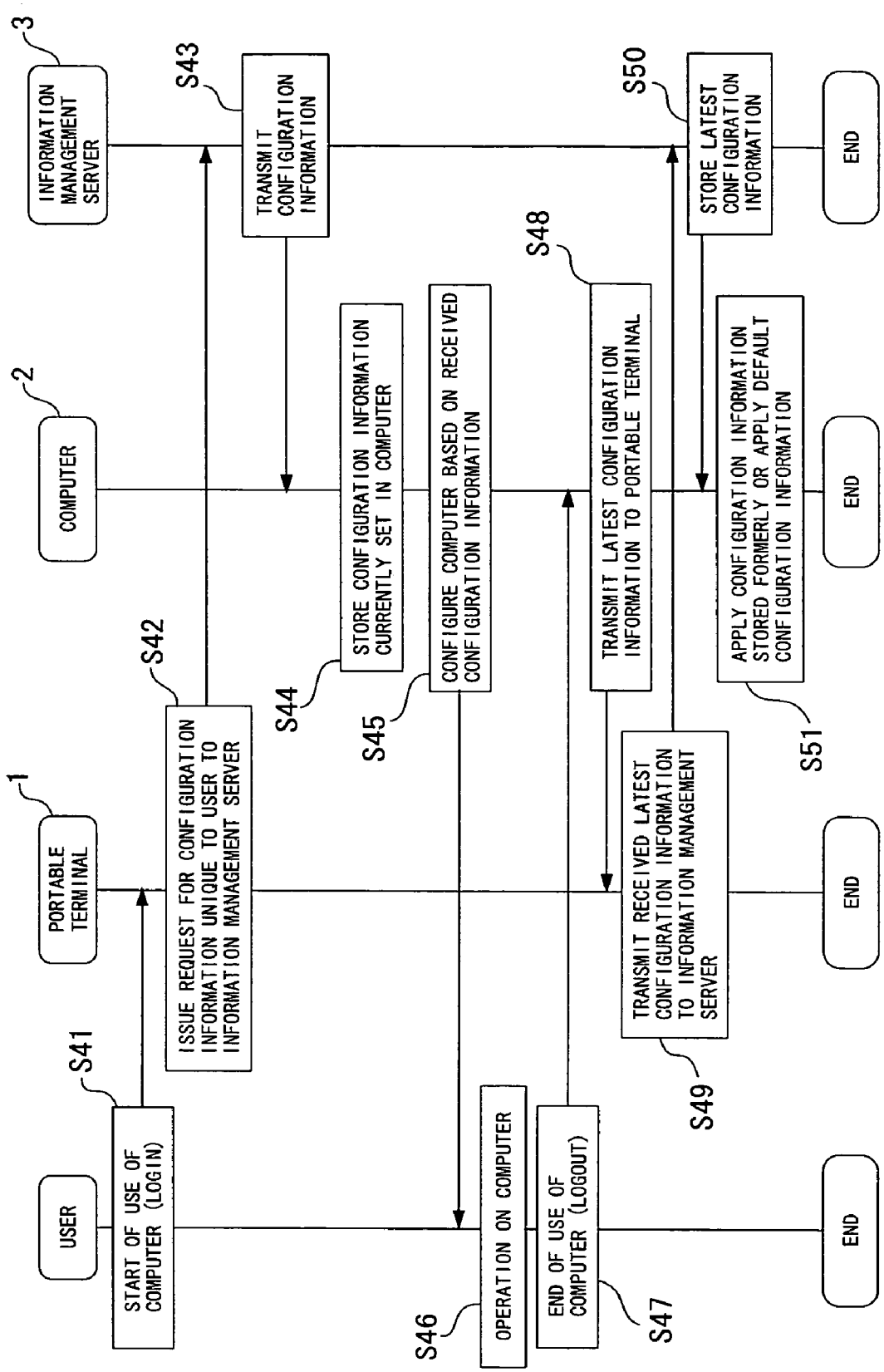
FIG. 6 is a similar view but illustrating operation of the automatic computer configuration system of FIG. 3.

FIG. 3 shows a system construction of an automatic computer configuration system according to a third embodiment of the present invention. Referring to FIG. 3, in the system shown, unique computer configuration information to be used for configuration of a computer 2 specified for a particular user is stored in an information management server 3 on a network 10 which includes a portable telephone network, and when the user logs in the computer 2, a portable terminal 1 possessed by the user accesses the information management server 3 on the network 10. In response to the access from the computer 2, the information management server 3 transmits computer configuration information unique to the user stored therein to the computer 2, and the computer 2 automatically establishes the configuration specified for the user. A flow of operations of the system in this instance is described with reference to FIG. 6.

If the user first connects, for example, at a use place 1, the portable terminal 1 of the user itself to a computer 2 located at the use place 1 by wire or wireless connection and logs in the computer 2 (step S41), then the portable terminal 1 issues a request to the information management server 3 to transmit the unique user configuration information to the designated computer 2 (step S42). The information management server 3 receives the request and transmits the requested computer configuration information to the designated computer 2 (step S43).

The computer 2 stores configuration information currently set therein (step S44) and automatically configures the computer 2 itself with the computer configuration information received from the information management server 3 (step S45) to exchangeably establish the configuration specified for the user. Consequently, the user can proceed immediately with operation of the computer 2 in accordance with the configuration suitable for the user itself without changing the configuration through manual inputting operation every time the user logs in the computer 2 (step S46).

When the use of the computer 2 comes to an end (upon logout) (step S47), the computer 2 transmits the latest computer configuration information to the portable terminal 1 (step S48), and the portable terminal 1 receives and transmits the latest computer configuration information to the information management server 3 (step S48). Consequently, the information management server 3 receives and stores the latest computer configuration information (step S50). Thereafter, the computer 2 uses the original computer configuration information stored for the backup formerly to restore the configuration (step S51). Or otherwise, the computer 2 uses default configuration information set in advance to restore the original default configuration.

While preferred embodiments of the present invention have been described using specific terms, such description is for illustrative purposes only, and it is to be understood that changes and variations may be made without departing from the spirit or scope of the following claims.

What is claimed is:

1. An automatic computer configuration method, comprising:

causing, upon login of a computer by a user, said computer to communicate with a portable terminal to receive unique computer configuration information to be used for a configuration of a computer specified for a particular user stored in said portable terminal;

rewriting a computer configuration information currently established in said computer based on the received computer configuration information to change the configuration of said computer to that specified for the user;

transmitting a latest computer configuration information from said computer to said portable terminal so that the latest computer configuration information may be stored into said portable terminal; and restoring, after the latest computer configuration information is transmitted to said portable terminal, the configuration of said computer using the computer configuration information used before the computer configuration information is rewritten with the unique computer configuration information received from said portable terminal.

2. An automatic computer configuration method, comprising:

transmitting, upon login of a computer by a user, ID information stored in a portable terminal from said portable terminal to said computer;

accessing, from said computer receiving the ID information, an information management server over a network based on the ID information so that unique computer configuration information, stored in said information management server for being used for a configuration of a computer specified for a particular user, is downloaded to said computer; and rewriting computer configuration information currently established in said computer, based on a downloaded computer configuration information to change the configuration of said computer to that specified for the user;

transmitting a latest computer configuration information from said computer to said information management server over said network so that the latest computer configuration information may be stored into said information management server; and restoring, after the latest computer configuration information is transmitted to said information management server, the configuration of said computer, using the computer configuration information used before the computer configuration information is rewritten with the unique computer configuration information received from said information management server.

3. An automatic computer configuration method, comprising:

accessing, upon login of a computer by a user, an information management server from a portable terminal over a network so that unique computer configuration information stored in said information management sewer for being used for a configuration of a computer specified for a particular user is downloaded to said computer; and rewriting computer configuration information currently established in said computer based on the downloaded computer configuration information to change the configuration of said computer to that specified for the user;

transmitting the latest computer configuration information from said computer to said information management server through said portable terminal so that a latest computer configuration information may be stored into said information management server; and restoring, after the latest computer configuration information is transmitted to said information management server through said portable terminal, the configuration of said computer using the computer configuration information used before the computer configuration information is rewritten with the unique computer configuration information received from said information management server.

* * * * *